(12) United States Patent
Vittimberga et al.

(10) Patent No.: US 10,354,175 B1
(45) Date of Patent: Jul. 16, 2019

(54) METHOD OF MAKING A TRANSACTION INSTRUMENT

(71) Applicant: WELLS FARGO BANK, N.A., San Francisco, CA (US)

(72) Inventors: Paul Vittimberga, Oakland, CA (US); Kristine Ing, Orinda, CA (US); John Wright, Benicia, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 14/933,472

(22) Filed: Nov. 5, 2015

Related U.S. Application Data

(63) Continuation-in-part of application No. 14/564,842, filed on Dec. 9, 2014.

(60) Provisional application No. 61/914,118, filed on Dec. 10, 2013.

(51) Int. Cl.
*G06K 19/04* (2006.01)
*G06K 19/08* (2006.01)
*G06K 19/077* (2006.01)
*B33Y 10/00* (2015.01)
*B33Y 80/00* (2015.01)

(52) U.S. Cl.
CPC ..... *G06K 19/041* (2013.01); *G06K 19/07745* (2013.01); *G06K 19/07773* (2013.01); *G06K 19/08* (2013.01); *B33Y 10/00* (2014.12); *B33Y 80/00* (2014.12)

(58) Field of Classification Search
CPC ........ G06K 19/06; G06K 19/00; G06K 19/02; G06K 5/00; G06K 7/08
USPC ............... 235/492, 380, 488, 487, 451, 375
See application file for complete search history.

(56) References Cited

U.S. PATENT DOCUMENTS

| | | | |
|---|---|---|---|
| 4,114,032 A | 9/1978 | Brosow et al. | |
| 4,906,494 A | 3/1990 | Babinec et al. | |
| 5,106,288 A | 4/1992 | Hughes | |
| 5,120,589 A | 6/1992 | Morikawa et al. | |
| 5,134,773 A | 8/1992 | LeMaire et al. | |
| 5,236,637 A | 8/1993 | Hull | |
| 5,434,917 A | 7/1995 | Naccache et al. | |
| 5,602,381 A | 2/1997 | Hoshino et al. | |
| 5,714,747 A | 2/1998 | West et al. | |
| 6,104,311 A | 8/2000 | Lastinger | |
| 6,176,430 B1 * | 1/2001 | Finkelstein | G02B 3/08 235/487 |

(Continued)

FOREIGN PATENT DOCUMENTS

| | | |
|---|---|---|
| JP | H06103423 A | 4/1994 |
| KR | 20100000467 A | 1/2010 |

(Continued)

OTHER PUBLICATIONS

Waters, M., Cast vs. Calendered Vinyl, Signindustry.com, http://www.signindustry.com/vinyl/articles/2013-05-15-Avery-CastVsCalendered.php3, Jun. 9, 2015, pp. 1-3.

(Continued)

*Primary Examiner* — Edwyn Labaze
(74) *Attorney, Agent, or Firm* — Shumaker & Sieffert, P.A.

(57) ABSTRACT

A transaction instrument and a method of making a transaction instrument by continuous liquid interface production. The transaction instrument such as a transaction card may have many features or components made by or using continuous liquid interface production.

30 Claims, 28 Drawing Sheets

(56) References Cited

U.S. PATENT DOCUMENTS

| | | | |
|---|---|---|---|
| 6,221,296 B1 | 4/2001 | James et al. | |
| 6,364,982 B1 | 4/2002 | Lynch | |
| 6,471,128 B1 | 10/2002 | Corcoran et al. | |
| 6,894,624 B2 | 5/2005 | Kim et al. | |
| 6,930,606 B2 | 8/2005 | Crane et al. | |
| 7,240,847 B2 | 7/2007 | Püschner et al. | |
| 7,241,537 B2 | 7/2007 | Kaule | |
| 7,494,057 B2 | 2/2009 | Lasch et al. | |
| 7,733,231 B2* | 6/2010 | Carney | B42D 25/00 235/382 |
| 7,785,680 B2 | 8/2010 | Brennan et al. | |
| 7,892,474 B2 | 2/2011 | Shkolnik et al. | |
| 8,121,386 B2 | 2/2012 | Rancien | |
| 8,302,870 B2 | 11/2012 | Paeschke et al. | |
| 8,322,623 B1* | 12/2012 | Mullen | G06K 19/06206 235/488 |
| 8,383,329 B2 | 2/2013 | Matsuda et al. | |
| 8,523,062 B2 | 9/2013 | Varga et al. | |
| 9,016,591 B2 | 4/2015 | Herslow et al. | |
| 9,390,363 B1 | 7/2016 | Herslow et al. | |
| 2003/0131932 A1* | 7/2003 | Hoult | B29C 35/0272 156/272.8 |
| 2005/0035491 A1 | 2/2005 | Bagnall et al. | |
| 2005/0196604 A1 | 9/2005 | Funicelli et al. | |
| 2005/0277231 A1* | 12/2005 | Hembree | H01L 21/563 438/127 |
| 2006/0074813 A1 | 4/2006 | Saunders | |
| 2006/0147742 A1 | 7/2006 | Matsuda et al. | |
| 2008/0063462 A1* | 3/2008 | Steinschaden | B43K 1/08 401/195 |
| 2009/0074231 A1 | 3/2009 | Rancien | |
| 2009/0184168 A1 | 7/2009 | Ricketts et al. | |
| 2010/0078489 A1 | 4/2010 | Winkler | |
| 2010/0096465 A1* | 4/2010 | Stagg | B42D 15/006 235/493 |
| 2010/0194093 A1* | 8/2010 | MacPherson | B42D 25/355 283/94 |
| 2011/0064388 A1 | 3/2011 | Brown et al. | |
| 2012/0055013 A1 | 3/2012 | Finn | |
| 2012/0125993 A1* | 5/2012 | Thiele | B42D 25/405 235/375 |
| 2012/0153812 A1 | 6/2012 | Aurongzeb et al. | |
| 2013/0292862 A1 | 11/2013 | Joyce | |
| 2013/0295212 A1 | 11/2013 | Chen et al. | |
| 2013/0300101 A1 | 11/2013 | Wicker et al. | |
| 2013/0332353 A1 | 12/2013 | Aidasani et al. | |
| 2013/0334808 A1 | 12/2013 | Hazen et al. | |
| 2013/0335416 A1 | 12/2013 | Coon et al. | |
| 2014/0014715 A1* | 1/2014 | Moran | G06K 19/06084 235/375 |
| 2014/0076965 A1 | 3/2014 | Becorest et al. | |
| 2014/0117094 A1* | 5/2014 | Workley | G06K 7/084 235/492 |
| 2014/0129354 A1 | 5/2014 | Soon-Shiong | |
| 2014/0273961 A1 | 9/2014 | Narendra et al. | |
| 2014/0344091 A1 | 11/2014 | Krebs | |
| 2014/0367894 A1 | 12/2014 | Kramer et al. | |
| 2014/0367957 A1 | 12/2014 | Jordan | |
| 2014/0379557 A1* | 12/2014 | Brown | G06T 3/40 705/39 |
| 2015/0041546 A1 | 2/2015 | Herslow et al. | |
| 2015/0042755 A1 | 2/2015 | Wang | |
| 2015/0045934 A1 | 2/2015 | Kallenbach et al. | |
| 2015/0087427 A1 | 3/2015 | Wane | |
| 2015/0088290 A1* | 3/2015 | Ghosh | G06F 17/50 700/98 |
| 2015/0095213 A1 | 4/2015 | Paintin | |
| 2015/0097315 A1 | 4/2015 | Desimone et al. | |
| 2016/0307088 A1* | 10/2016 | Wurmfeld | G06K 19/07722 |
| 2016/0363613 A1* | 12/2016 | Albertson | G01R 1/06755 |

FOREIGN PATENT DOCUMENTS

| | | |
|---|---|---|
| KR | 20160066300 A | 6/2016 |
| KR | 101653702 B1 | 9/2016 |
| WO | 2009/084774 A1 | 7/2009 |

OTHER PUBLICATIONS

Wikipedia, 3D printing, http://en.wikipedia.org/wiki/3D_printing, Oct. 29, 2013, pp. 1-8.

Leaversuch, Robert D., Article, Now They Want Plastics to Be Heavy?, Plastics Technology, 5 pages, (Jun. 2001).

Article, Metal 3D Printing, http://gpiprototype.com/services/metal-3d-printing.html, Jun. 9, 2015, pp. 1-3.

Smart Card Technology, The Smart Card Report (Eighth Edition), pp. 269-287 (2004), only first page available online; full article available for purchase at http://www.sciencedirect.com/science/article/pii/B9781856174176500121.

Launey, Maximilien E., Munch, Etienne, Alsem, Daan Hein, Saiz, Eduardo, Tomsia, Antoni P., and Ritchie, Robert O.; A novel biomimetic approach to the design of high-performance ceramic-metal composites; Journal of the Royal Society Interface; Oct. 14, 2009; pp. 741-753; published online.

Bourzac, Katherine; Ceramics That Won't Shatter; MIT Technology Review; Dec. 4, 2008; http://www.technologyreview.com/news/411301/ceramics-that-wont-shatter/page/2/; accessed on Nov. 20, 2014.

Technical Overview of Biopolymer Field; https://www.princeton.edu/~ota/disk1/1993/9313/931304.PDF; accessed Aug. 18, 2016.

Huisman, J., Stevel, A.L.N, Stobbe, I.; Eco-efficiency considerations on the end-of-life of consumer electronic products; IEEE Transactions on Electronics Packaging Manufacturing, v 27, n. 1, p. 9-25; Jan. 2004.

Prosecution History from U.S. Appl. No. 14/564,842, dated Apr. 20, 2015 through Jan. 9, 2019, 101 pp.

U.S. Appl. No. 14/564,842, (Naming Inventors: Vittimberga et al.), filed Dec. 9, 2014.

* cited by examiner

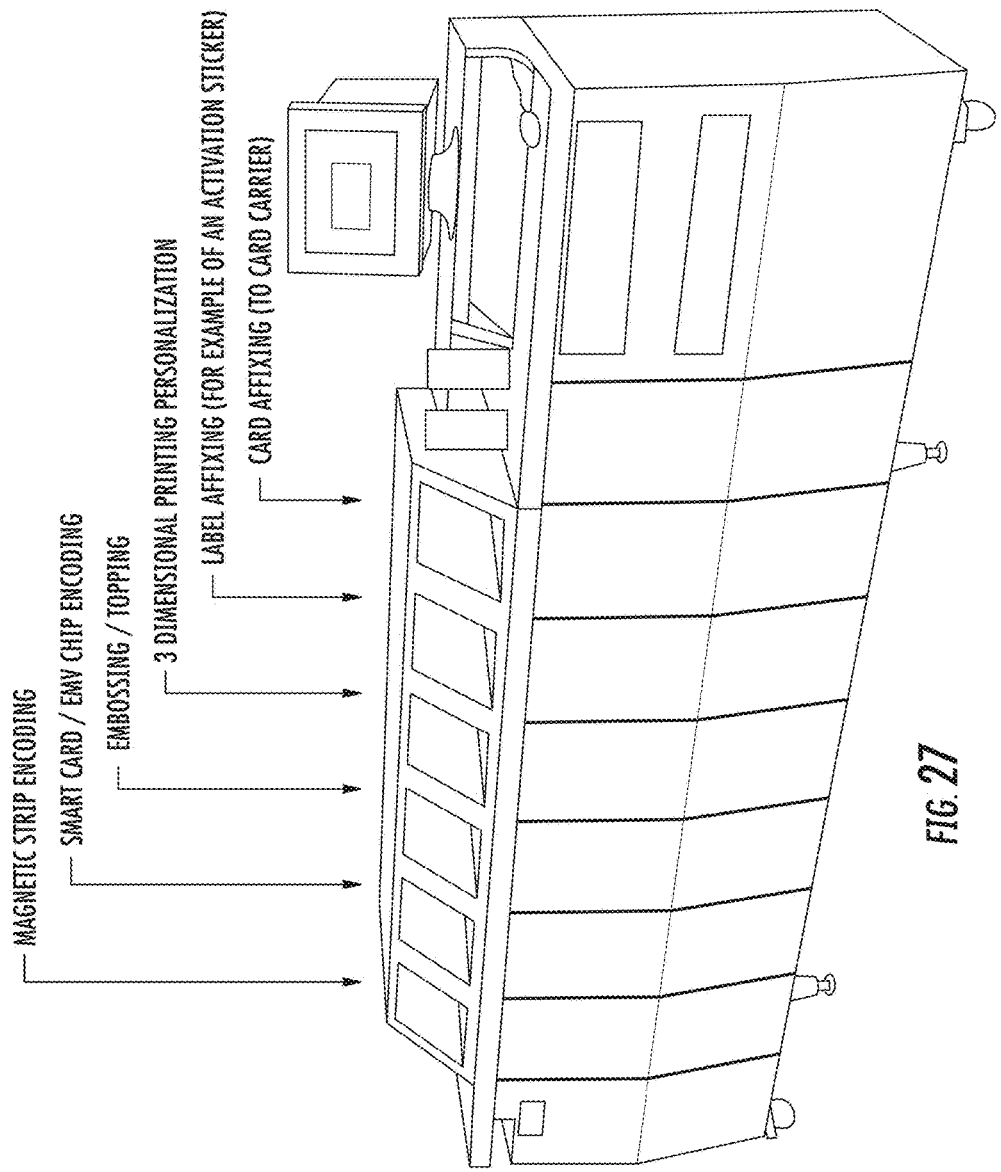

METHOD OF MAKING A TRANSACTION INSTRUMENT

CROSS-REFERENCE TO RELATED APPLICATIONS

This application is a continuation-in-part application that claims priority from U.S. patent application Ser. No. 14/564,842, filed on Dec. 9, 2014, which claims priority from U.S. provisional application No. 61/914,118, filed Dec. 10, 2013, in the United States Patent and Trademark Office. The disclosures of which are incorporated herein by reference in their entireties.

FIELD OF THE INVENTION

The present invention relates to a method of making a transaction instrument such as for use in a financial transaction.

BACKGROUND OF THE INVENTION

Payment cards are used every day for financial transactions throughout the world. The most common examples of payment cards are credit cards and debit cards. The most common method by which such cards are currently mass manufactured is by extruding and/or calendaring one or more layers of plastic, applying printing, and laminating said layers, often along with additional foils or protective coatings. However, there are disadvantages associated with such processes. Mass manufacturing creates the card and then subsequently the card must be personalized through embossing, printing, laser etching or some other means. A recess may have to be formed through milling or another removal process in order to allow for the insertion of the devices such as a package containing an integrated circuit and contacts. Mass manufacturing also does not support customization of shape, color, or other features of the card body on a card by card basis. Mass manufacturing is not well suited to producing metal cards, since they are expensive and difficult to personalize. Mass manufacturing does not support production in remote locations such as a branch location or a customer site. Also, mass manufacturing is done in larger batches and creates inventory and carrying costs. There are also disadvantages associated with other manufacturing methods such as 3D printing methods which are slow for manufacturing purposes and produce rough-sided objects.

Thus, there is a need for an alternative method of making a payment card or transaction instrument that addresses the disadvantages.

SUMMARY OF THE INVENTION

The present invention relates to a transaction instrument and a method of making a transaction instrument by a method comprising continuous liquid interface production, also referred to as "CLIP."

In an embodiment of the present invention, a method of making a transaction instrument is provided. The method comprises providing a pool of liquid photopolymer resin and producing a transaction instrument by continuous liquid interface production.

In another embodiment of the present invention, a method of making a transaction instrument comprises making an object from a digital model by continuous liquid interface production, and the object is a financial transaction instrument.

In yet another embodiment of the present invention, a kit is provided. The kit comprises a transaction instrument made by continuous liquid interface production. The transaction instrument has one or more recesses formed in the transaction instrument, and at least one of a machine readable indicium, integrated circuit, antenna, or a combination thereof, each configured for insertion into one of the one or more recesses.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, which are not necessarily to scale, wherein:

FIG. 27 illustrates a station of a personalization line identified as a continuous liquid interface production station for personalization.

DETAILED DESCRIPTION OF THE INVENTION

The following detailed description of the embodiment(s) is merely exemplary in nature and is in no way intended to limit the invention, its application, or uses.

The present invention relates to a transaction instrument made by a method comprising continuous liquid interface production, also referred to as "CLIP." Continuous liquid interface production generally refers to a process that uses a pool of liquid photopolymer resin to form a smooth-sided solid object. At the bottom of the pool, there is a portion of the pool or a window that allows oxygen as well as ultraviolet (UV) light pass through it. Since oxygen blocks curing of the resin, the window forms a dead zone of non-curable resin on the bottom of the pool. The UV light beam illuminates the cross-section of an object and the light causes the resin to solidify. Thus, the UV light passes through the window and cures any low-oxygen resin sitting right above the dead zone. The object being manufactured is drawn upward from the liquid. In an embodiment of the present invention, a transaction instrument is made using such process.

Figure 1:
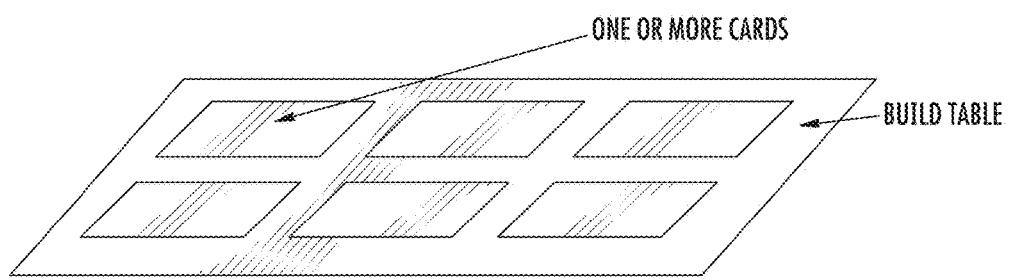
FIG. 1 illustrates a transaction instrument made by a method comprising continuous liquid interface production into a form of a transaction card.
Figure 2:
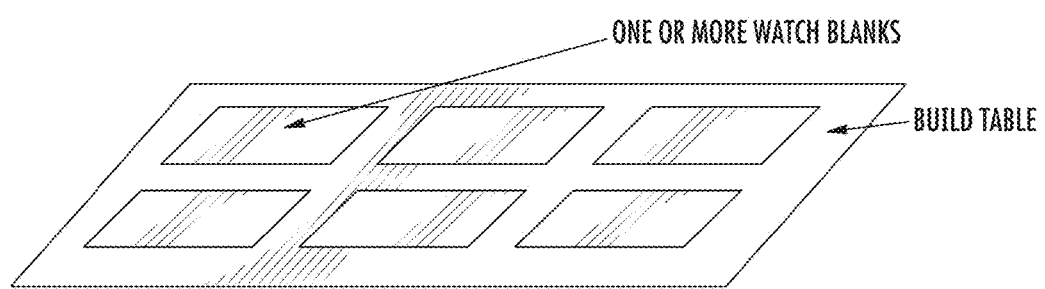
FIG. 2 illustrates a transaction instrument made by a method comprising continuous liquid interface production into a form of a watch blank.
Figure 3:
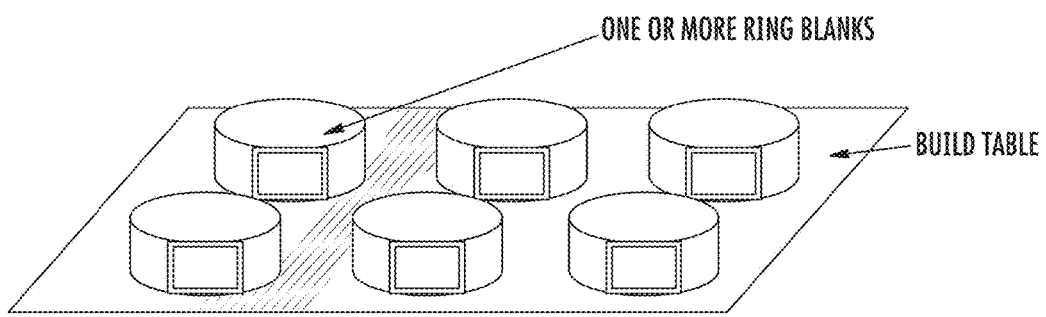
FIG. 3 illustrates a transaction instrument made by a method comprising continuous liquid interface production into a form of a ring.

In accordance with the invention, the transaction instrument is enabled to perform a financial transaction and is suitable for use in a financial transaction such as making a purchase or conducting another type of monetary transaction in commerce. Transaction instruments may be in the form of cards such as a credit card, debit card, automatic-teller machine (ATM) card, check card, stored-value cards, and gift cards, among others. Transaction instruments may be associated with various types of financial accounts such as a credit card account, debit card account, automatic-teller machine (ATM) account, direct deposit account, check, closed loop gift card account, open loop gift card account, or a combination thereof. Transaction instruments may take other various forms including, but not limited to, various electronic devices. As indicated above, the transaction instrument formed by continuous liquid interface production may be in various shapes and sizes. For example, the transaction instrument may be made by continuous liquid interface production into a traditional credit or debit card as shown in FIG. 1. The transaction instrument may be made by continuous liquid interface production into an electronic device in a form of a watch as shown in FIG. 2. The transaction instrument may be made by continuous liquid interface production into an electronic device in a form of a bracelet or a ring as shown in FIG. 3. The transaction instrument may be made by continuous liquid interface production into an electronic device in a form of a key ring or key fob, among other forms.

In an aspect of the invention, the transaction instrument is a card that has at least two sides or surfaces. The transaction card may have a graphics layer on one or both sides having an indicium indicative of an account associated with the transaction card. The indicium can be provided by at least one personalization process. The personalization process may comprise at least one of dye sublimation printing, screen printing, gravure printing, lithography, inkjet printing, laser printing, indentation, continuous liquid interface production, or a combination thereof. As a feature of the invention, the indicium is provided free from milling or laser etching. The indicium can also be provided by continuous liquid interface production. The indicium can be of a different color than the side of the card. The indicium can be raised with respect to the side of the card. The indicium may comprise Braille lettering.

In another aspect of the invention, the card is enabled to perform a financial transaction by inclusion of a machine readable indicium. The machine readable indicium may comprise a magnetic strip. As a feature of the invention, the transaction card comprises a recess to accommodate the machine readable indicium. The recess may begin approximately 3.8 mm (0.15 inches) to 16.5 mm (0.65 inches) from the longer edge of the card and have a width ranging from approximately 2.54 mm (0.10 inches) to 10.1 mm (0.40 inches). The recess can be made by leaving a void during the continuous liquid interface production process. The recess can be made using subtractive manufacturing after continuous liquid interface production. In another feature of the invention, continuous liquid interface production inclusive of the recess is done onto or around the machine readable indicium.

The transaction card has a surface finish in a range of 0.15 micrometers (6 microinches) to 0.40 micrometers (15.9 microinches).

In another aspect of the invention, the transaction card is compliant with at least a portion of ISO 7810, ISO 7811, ISO 7816, or a combination thereof.

The method of making the transaction instrument of the present invention comprises continuous liquid interface production. Continuous liquid interface production generally refers to making an object or shape from a digital computer model. A transaction instrument made in accordance with the present invention is comprised of material formed in a device directed by a computer model.

Among the types of continuous liquid interface production processes that may be suitable for use in the method of the present invention include, but are not limited to, stereolithography above an oxygen permeable window, involving photopolymerization of resins. Additionally, continuous liquid interface production of metals and metal blend processes may be suitable for use in the method of the present invention.

As indicated above, the transaction instrument made by continuous liquid interface production may be made in various shapes and sizes. The transaction instrument may also be finished. The transaction instrument may be finished, for example, by subtractive manufacturing.

A transaction instrument may be created by continuous liquid interface production into a transaction card such as a credit card or debit card as illustrated in FIG. 1. As shown in FIG. 1, a platform or table comprising one or more transaction cards can be built by continuous liquid interface production. A transaction instrument may be created by continuous liquid interface production into an electronic device in another form. As shown in FIG. 2, a table comprising one or more watch blanks can be built by continuous liquid interface production. A transaction instrument may be created by continuous liquid interface production into an electronic device in another form such as a bracelet or a ring as shown in FIG. 3. As shown in FIG. 3, a table comprising one or more ring blanks can be built by continuous liquid interface production. The transaction instrument may be created by continuous liquid interface production into an electronic device into a form including, but not limited to, a key ring or key fob, ring, watch, wrist band, bracelet, card, and other shaped devices.

The materials used in the transaction instrument of the present invention and in the method comprising continuous liquid interface production include, but are not limited to, plastic, metal, ceramic, carbon, graphite, diamond nanocrystals, and a combination thereof. The term "metal", as used herein, includes, but is not limited to, metallic elements, metal-containing compounds, other metal forms, or a combination thereof. The plastic may further comprise a plasticizer. The plastic may be optically transparent. The optically transparent plastic may be opaque to some or all light outside of the visible spectrum. The optically transparent plastic may be opaque to ultraviolet light.

In a preferred aspect of the invention, a combination of materials used is a plastic and metal blend such as a metal-filled plastic or metal-filled polymer.

Examples of materials that may be suitable for a method comprising continuous liquid interface production include, but are not limited to, trimethylolpropane triacrylate using a photoinitiator, diphenyl(2,4,6-trimethyl-benzoyl)phosphine oxide, and reactive diluents such as n-vinylpyrrolidone, isobornyl acrylate, and cyclohexane dimethanol di-vinyl ether. Photoinitiators include, but are not limited to, phenylbis(2,4,6-trimethyl-benzoyl)phosphine oxide, 1-hydroxycyclohexyl phenyl ketone, and 2-benzyl-2-(dimethylamino)-4'-morpholinobutyrophenone (reference #1). Plastics include, but are not limited to, polyvinyl chloride (PVC), polyvinyl chloride acetate (PVCA), oriented polyester, polyethylene, polyethylene terephthalate including biaxially-oriented polyethylene terephthalate, polyethylene glycol (PET-G), acrylonitrile butadiene styrene (ABS), polycarbonate, polypropylene, and a combination thereof.

In accordance with aspects of the present invention, the method of making a transaction instrument comprises making an object of any shape from a digital computer model. The method comprises providing a pool of liquid photopolymer resin, lifting a shape from a pool of liquid while solidifying material as the shape emerges from the liquid pool. In an aspect of the invention, the shape is in the form of a transaction instrument.

The method of making a transaction instrument in accordance with the present invention may comprise modeling, continuous liquid interface production steps, and finishing.

As to modeling, the method comprises virtual blueprints taken from computer aided design (CAD) or animation modeling software into a continuous sequence of UV images generated by a digital light processing imaging unit. The computer software may comprise a feature for customization of a shape for the transaction instrument, customization of personalization for the transaction instrument, or a combination thereof.

A standard data interface between CAD software and the machines is the stereolithography (STL) file format. An STL file approximates the shape of a part or assembly using triangular facets. Smaller facets produce a higher quality surface. Polygon file format (PLY) is a scanner generated input file format, and virtual reality modeling language (VRML or WRL) files could be used as input for continuous liquid interface production technologies that are in full color.

As to finishing, the method may further comprise making through continuous liquid interface production a slightly oversized version of the object in standard resolution and then removing material with a higher-resolution subtractive process.

The method may further comprise continuous liquid interface production to pre-form a recess(es) around one or more components or inset devices of the transaction instrument. As a feature of the invention, the inset device is optionally set in a pocket or a pouch, and continuous liquid interface production inclusive of the recess is done onto or around the pocket or the pouch. In order to protect the device from the liquid, the material could be deposited forming a void around the inset device or the inset device set in the pocket or the pouch. Examples of one or more components include, but are not limited to, a chip such as a Europay-Mastercard-Visa (EMV) chip, a contactless antenna, a contactless antenna chip, a magnetic strip, an in-laid decoration, embedded features, and continuous liquid interface production created features. The recess has a size and a shape to accommodate the component or inset device with or without the pocket or the pouch.

Figure 4:
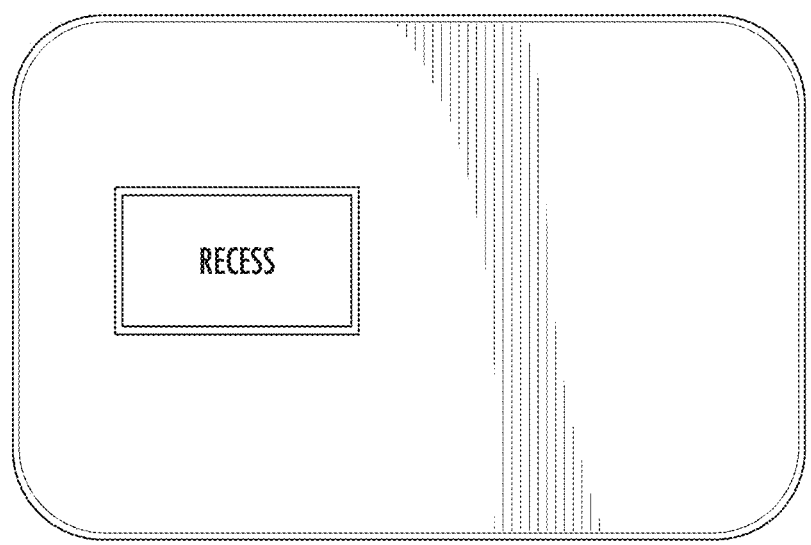
FIG. 4 illustrates the top view of a transaction instrument as made by a method comprising continuous liquid interface production into a form of a transaction card that has a recess on the top face to allow the insertion of a device into the top surface.

In an aspect of the present invention, the inset device comprises at least one integrated circuit, also referred to as a chip. FIG. 4 illustrates the top view as made by a method comprising continuous liquid interface production of a transaction instrument in a form of a transaction card that has a recess on the top face to allow the insertion of a device into the top surface. The front of the card shows a recess such as for insertion of a chip. A recess is generally defined as an indentation, a cavity or an opening. The recess is left as a void when the card is produced. The recess may be filled with supportive, non-binding material or may simply be an empty space.

Figure 5:
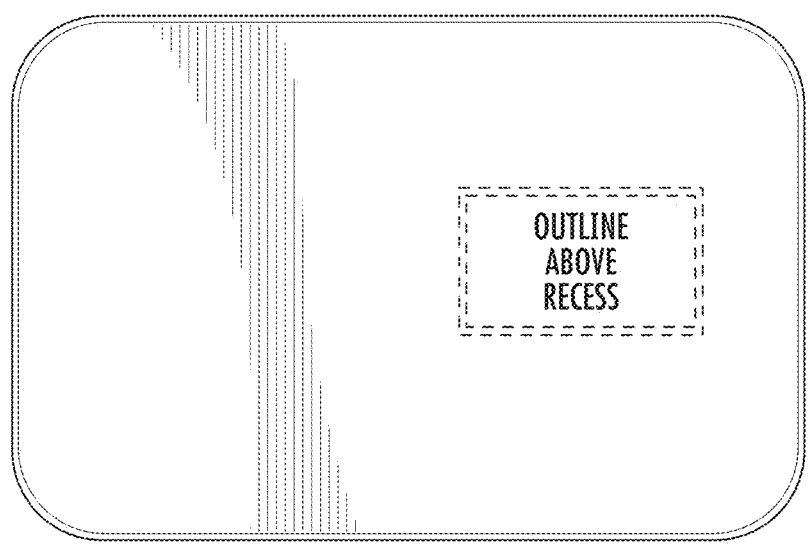
FIG. 5 illustrates a top view of a transaction instrument as made by a method comprising continuous liquid interface production into the form of a card that has a recess on the bottom surface below imaginary dashed lines to allow the insertion of a device into the bottom surface.

FIG. 5 illustrates a top view as made by a method comprising continuous liquid interface production of a transaction instrument in the form of a card that has a recess on the bottom surface below the imaginary dashed lines to allow the insertion of a device into the bottom surface. The recess is on the downward facing front of the card. In this configuration, the recess may be filled with supportive, non-binding material or with a pre-made blank that is either a part of the build platform or is placed on top of the build platform.

In accordance with aspects of the method of the present invention, the method comprises forming the card around the chip. In order to protect the chip from the liquid, the material could be deposited forming a void around the chip.

In an aspect of the invention, transaction card may have a recess for a contactless antenna/wires and a contactless antenna chip. This feature is particularly desirable for a split layer card where the recess is on an inner layer and the recessed portion would have the wires and chip added and then laminated to the other layers.

Figure 6:
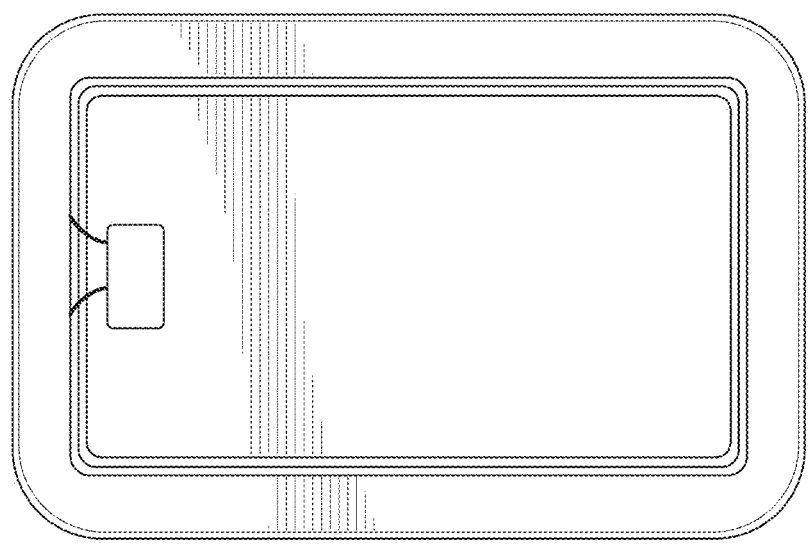
FIG. 6 illustrates a top view of a card or portion thereof as made by a method comprising continuous liquid interface production with a recess to allow for the insertion of contactless antenna and chip.

FIG. 6 illustrates the top view of a card or portion thereof as made by a method comprising continuous liquid interface production with a recess to allow for the insertion of contactless antenna and chip. The recess is on the downward facing front of the card. In this case, the recess is filled with supportive, non-binding material or with a pre-made blank that is either a part of the build platform or is placed on top of the build platform.

Figure 7:
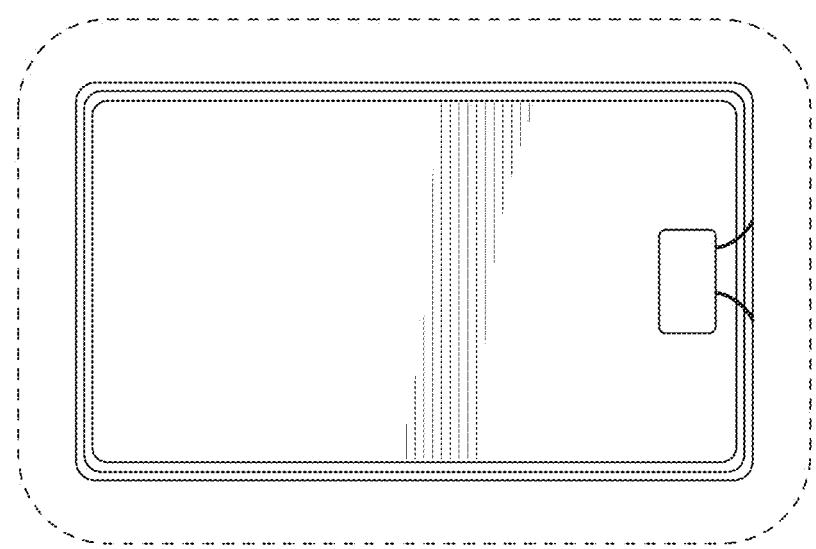
FIG. 7 illustrates a top view of a card as made by a method comprising continuous liquid interface production showing a contactless antenna and associated chip package directly under the imaginary dashed lines which was covered over by continuous liquid interface production.

FIG. 7 illustrates a top view of a card as made by a method comprising continuous liquid interface production showing a contactless antenna and associated chip package directly under the imaginary dashed lines where the card was created around the package.

Figure 8:
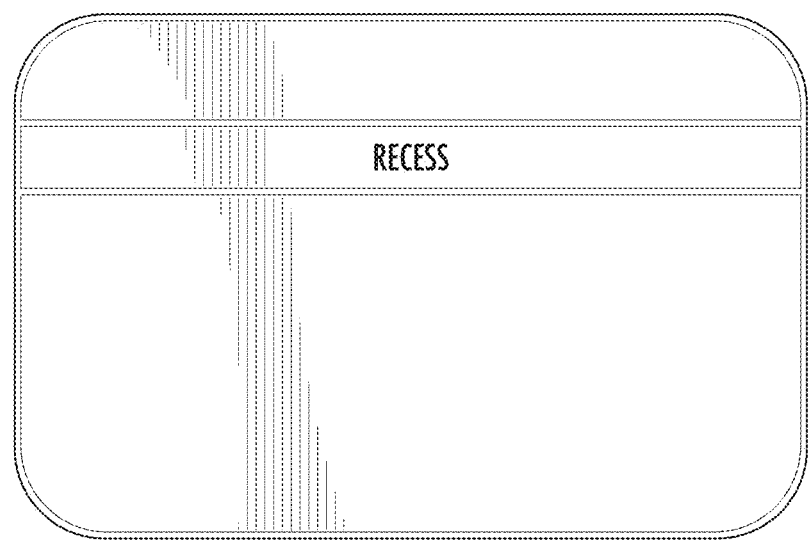
FIG. 8 illustrates a top view of a card as made by a method comprising continuous liquid interface production with a recess such as for insertion of a magnetic strip.

FIG. 8 illustrates another possible feature of a transaction card. FIG. 8 illustrates a top view of a card as made by a method comprising continuous liquid interface production with a recess such as for insertion of a magnetic strip. A magnetic strip is another possible feature of a transaction card made in accordance with the present invention. The recess may be filled with supportive, non-binding material or may simply be empty space.

Figure 9:
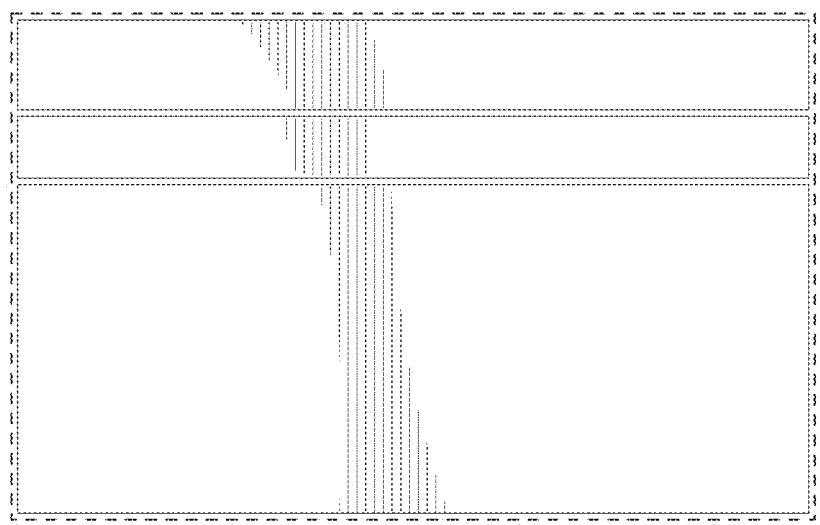
FIG. 9 illustrates a top view of a card as made by a method comprising continuous liquid interface production showing an outline above the recess on the bottom for insertion of a magnetic strip.

FIG. 9 illustrates a top view of the card as created by continuous liquid interface production showing an outline above the recess on the bottom for insertion of a magnetic strip. The recess is on the downward facing front of the card. In this case, the recess can be filled with supportive, non-binding material or with a pre-made blank that is either a part of the build platform or is placed on top of the build platform.

Figure 10A:
FIG. 10A illustrates a card showing recesses for inlaid decoration.
Figure 10B:
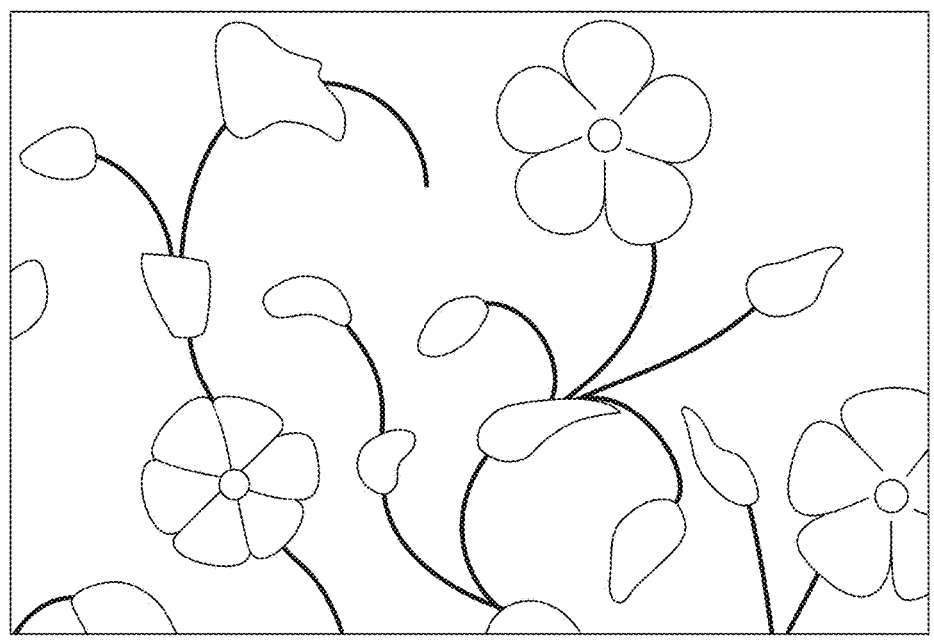
FIG. 10B illustrates a card with inlaid decoration added.

In accordance with aspects of continuous liquid interface production the transaction instrument of the present invention, there may be decorative features to a transaction card. One such example is an inlaid decoration as illustrated in FIGS. 10A and 10B. The transaction instrument may be created around the inlay by creating it around the inlay as it is lifted from the liquid.

FIG. 10A illustrates a card showing recesses for inlaid decoration, and FIG. 10B illustrates a card with inlaid decoration added. In accordance with the method comprising continuous liquid interface production of the present invention, a recess or recesses may or may not be created when the card is created. Depending on the type of continuous liquid interface production technology, the recess may be filled with supportive, non-binding material or may simply be empty space. The recess may be filled with supportive, non-binding material or with a pre-made blank that is either a part of the build platform or is placed on top of the build platform. Inlaid decoration(s) are laid down first and then card is built on top of it.

In accordance with aspects of making a transaction instrument of the present invention, the transaction instrument may be made by a method comprising continuous liquid interface production with embedded, fabricated features. The transaction instrument may be made of one or more types of materials. For example, a metal antenna may be made through a method comprising continuous liquid interface production and a plastic card body may be made around or over it through a method comprising continuous liquid interface production.

Figure 11:
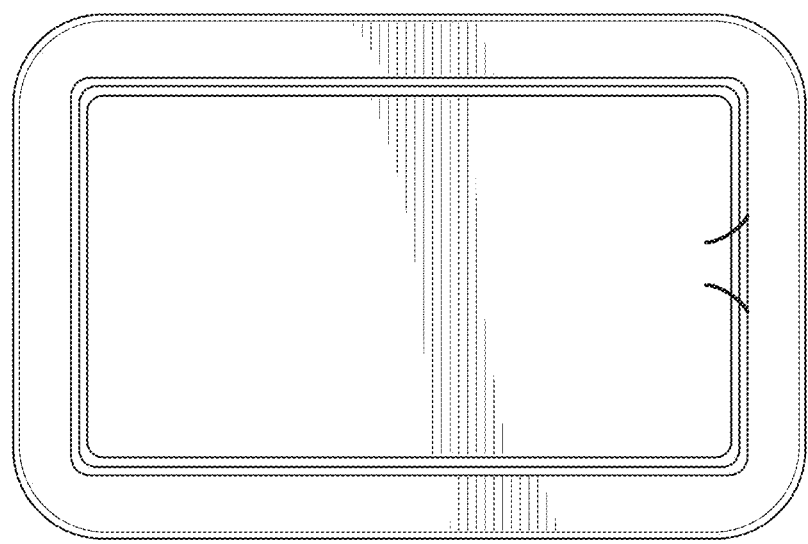
FIG. 11 illustrates a transaction card having a contactless antenna in which the antenna was made as part of a method comprising continuous liquid interface production.

A transaction instrument may be made by a method comprising continuous liquid interface production to have various features including, but not limited to, the following features. FIG. 11 illustrates a transaction card having a contactless antenna in which the antenna was made as part of a method comprising continuous liquid interface production process. A plastic card body may be made by a method comprising continuous liquid interface production with a metal antenna (shown in black) also made by a method comprising continuous liquid interface production. An alternative is the plastic body can be made by another method of manufacture, inserted onto the build platform, and then the antenna can be made through a method comprising continuous liquid interface production. Completion of the plastic card can then be done by a method comprising continuous liquid interface production or traditional lamination of layers.

Figure 12:
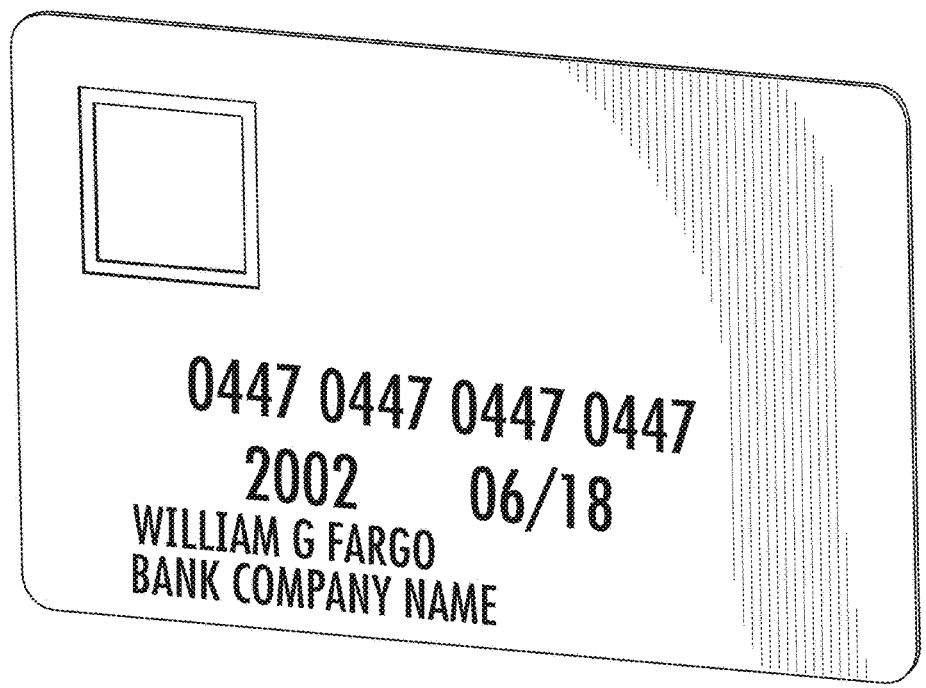
FIG. 12 illustrates a recess for an inset device such as an EMV chip.

FIG. 12 illustrates a recess for an inset device such as an EMV chip.

Figure 13:
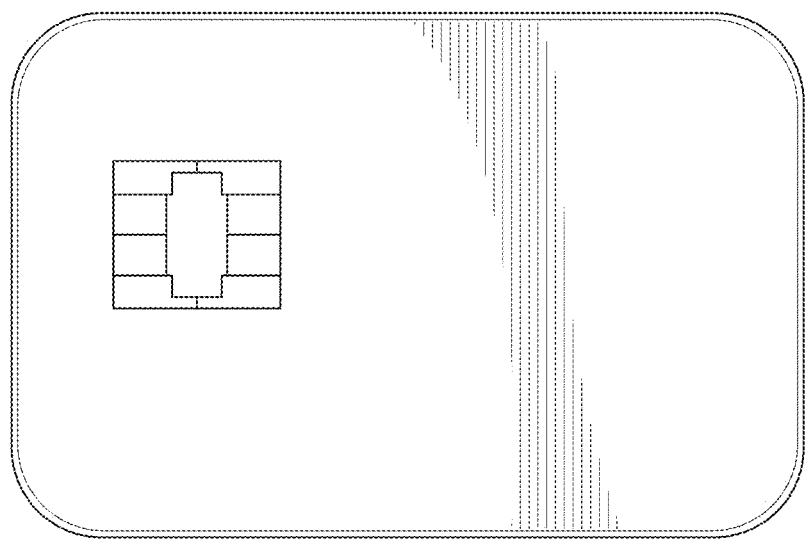
FIG. 13 illustrates a transaction card having contact pads such as EMV contact pads.

In another aspect of the present invention, the inset device comprises one or more conducting contact pads. FIG. 13 illustrates a transaction card having conducting contact pads such as EMV contact pads. The contact pads can be made in any shape as long as the required contact points are included. In another feature of the present invention, the contact pad(s) are located as set forth in ISO 7816 and/or have dimensions including a minimum size as set forth in ISO 7816.

Figure 14:
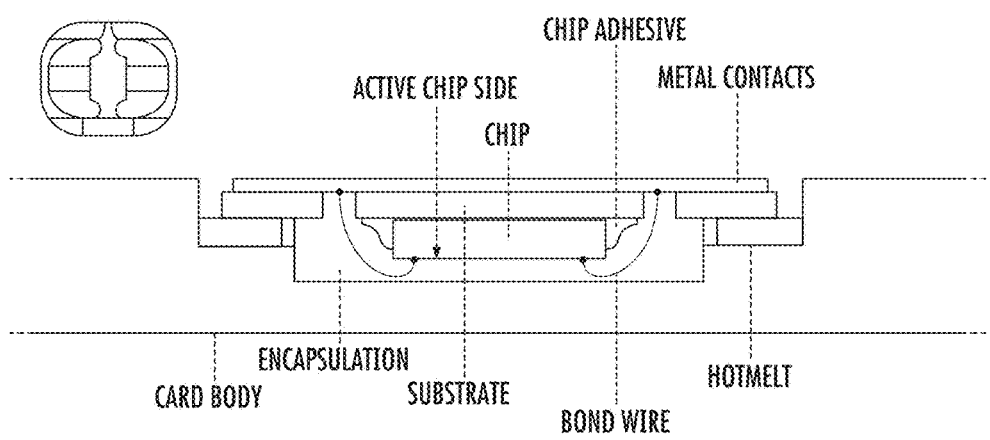
FIG. 14 illustrates a typical package for a contact smart card.

The plastic card body may be made through a method comprising continuous liquid interface production or traditional methods of making a plastic card body. For example, a chip such as an EMV chip and/or a lead package is placed in a card body or a card body is built around the chip and the lead package. A contact pad for an EMV chip is made in metal through a method comprising continuous liquid interface production. The shape of the created contacts can be decorative and take any shape as long as the five required contact pads are covered. FIG. 14 illustrates a typical package for a contact smart card and card body, noting that a smart card has conductive contact pads (metal contacts). The conductive pads are attached to a chip by small bond wires. The conductive pad, chip, and bond wires are pre-manufactured into a package. This package has a depth of up to 20 mils and is deeper in the center than on the edges. The package is inserted and secured typically with a chip adhesive and a hot melt glue into a recess with a deep center of approximately 20 mils and a shallower perimeter of 5 mils to 7 mils. The active chip side in relation to the substrate and encapsulation is illustrated in FIG. 14.

Figure 15:
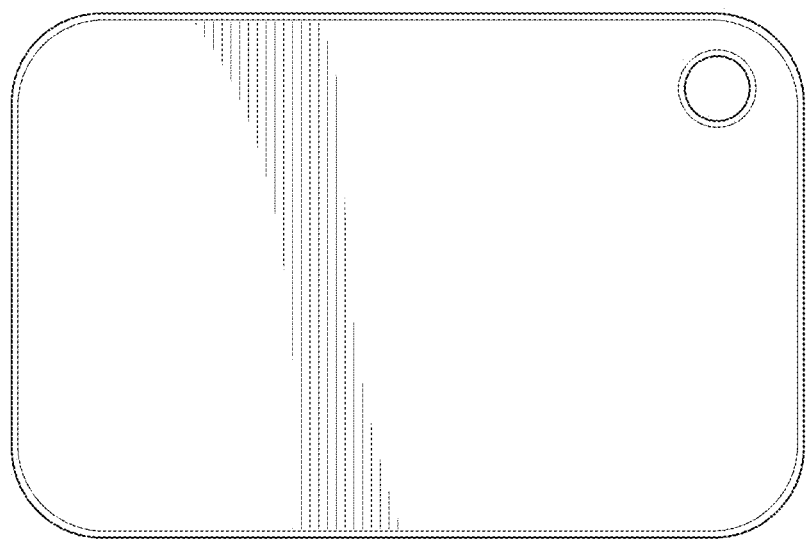
FIG. 15 illustrates a transaction card having a hole made for a key chain or other attachment.
Figure 16A:
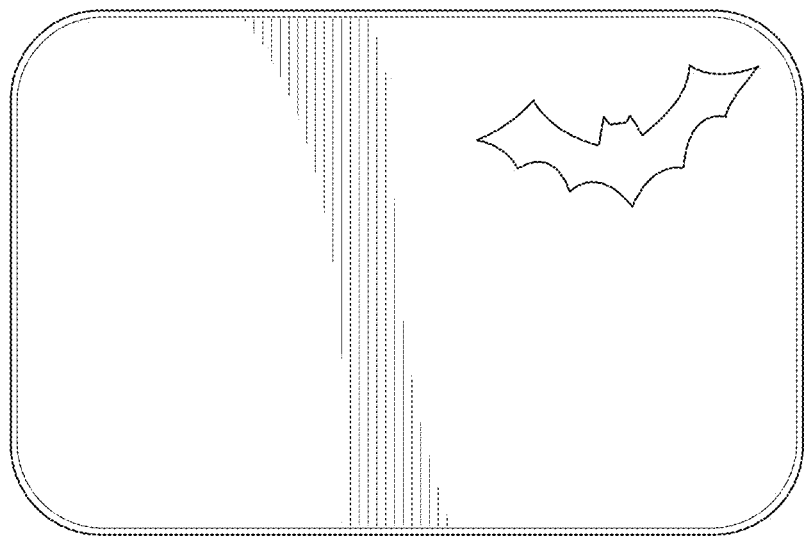
FIGS. 16A and 16B illustrate that decorative holes in a transaction card of various patterns or shapes.
Figure 16B:
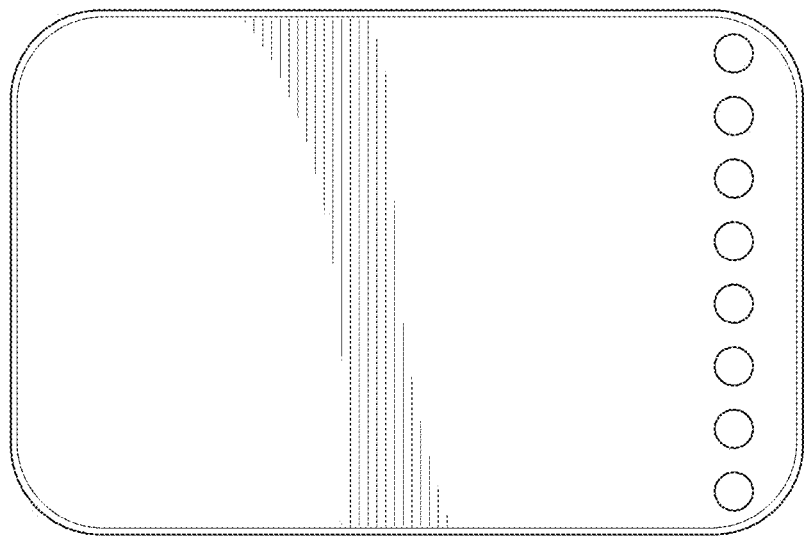

Another feature of a transaction card made in accordance with the method of the present invention is a hole made for a keychain or other attachment as shown in FIG. 15. An attachment hole may be at any location on the card that does not have other required elements such as the magnetic stripe, chip, signature area, embossing area, among other elements. Decorative holes may be made in various patterns or shapes as shown in FIGS. 16A and 16B. A decorative hole or holes may be made at any location on the card that does not have other required elements such as the magnetic stripe, chip, signature area, embossing area, among other elements.

Figure 17:
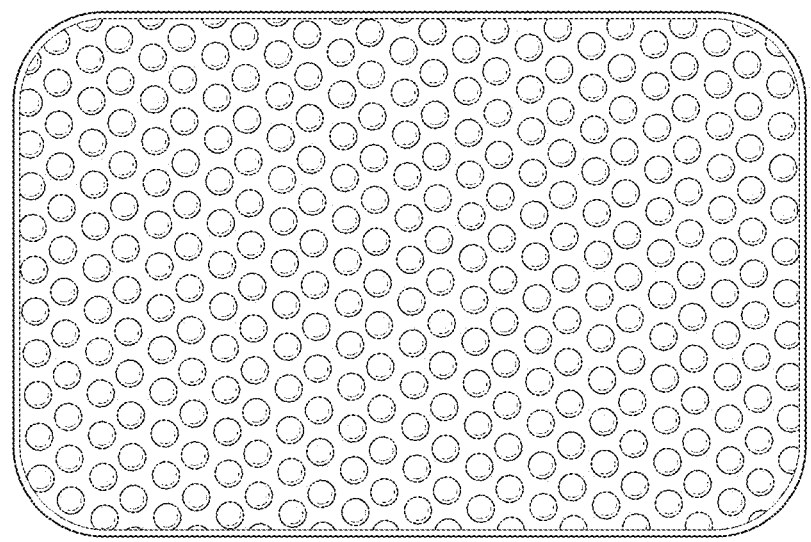
FIG. 17 illustrates a transaction card made by a method comprising continuous liquid interface production having a textured finish.
Figure 18:
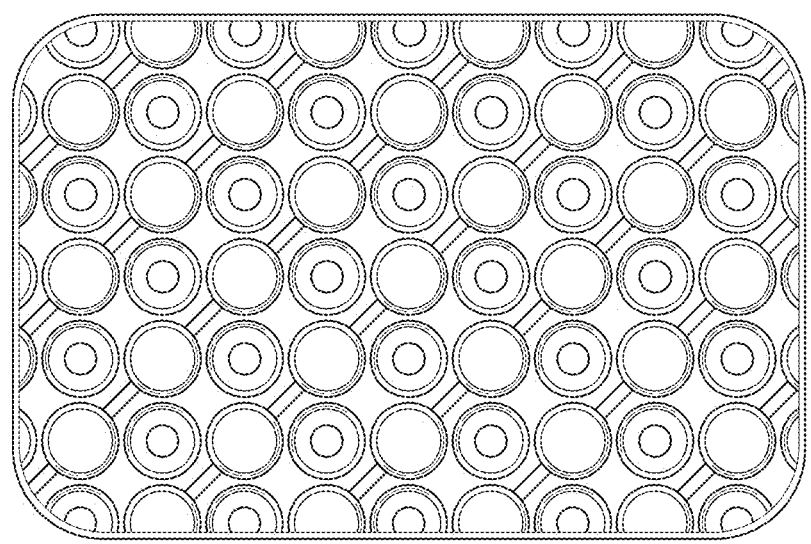
FIG. 18 illustrates a transaction card made by a method comprising continuous liquid interface production having texture combined with holes.

A transaction card made by a method comprising continuous liquid interface production in accordance with the present invention may have a textured finish as illustrated in FIG. 17. FIG. 17 illustrates a card having a dimpled texture; however, many textures are possible such as in a pattern (such as shown), randomly, or in a way that makes a picture. Texture can also be combined with holes as shown in FIG. 18.

Figure 19:
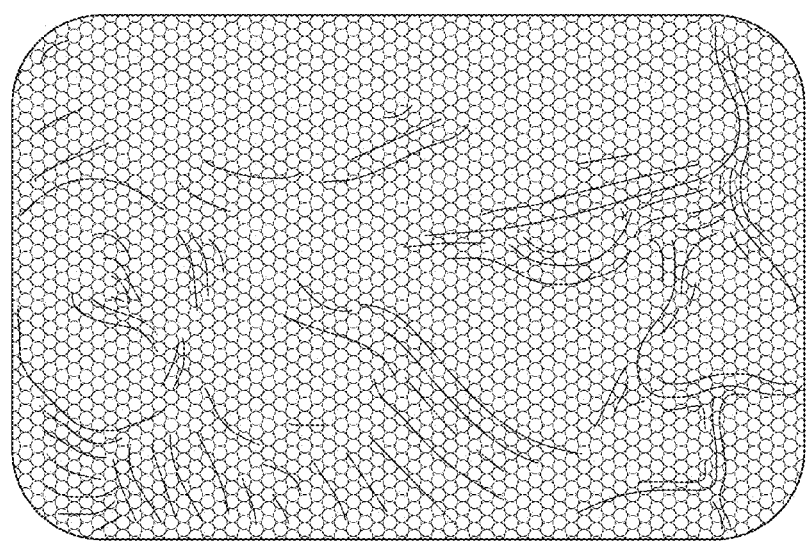
FIG. 19 illustrates a transaction card made by a method comprising continuous liquid interface production having contours including three-dimensional images.

A transaction card made by a method comprising continuous liquid interface production in accordance with the present invention may have contours, including 3D images as illustrated in FIG. 19. The face illustrated in FIG. 19 is an example of making a picture using contours. The use of contours can also be combined with different colors.

Figure 20:
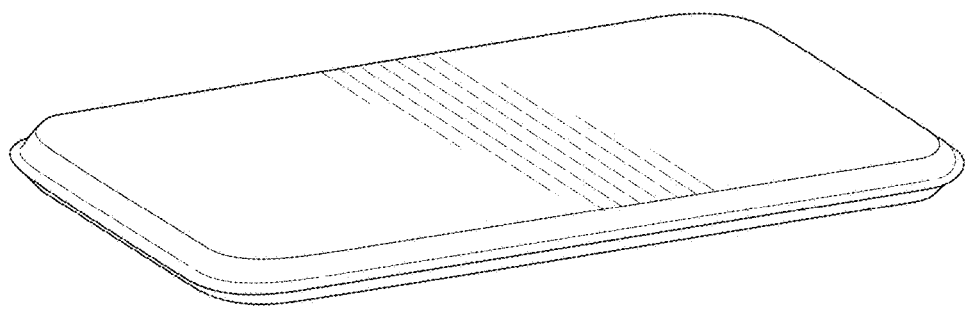
FIG. 20 illustrates a transaction card made by a method comprising continuous liquid interface production having beveled or filleted card edges.

A transaction card made by a method comprising continuous liquid interface production in accordance with the present invention may have beveled or filleted card edges as illustrated in FIG. 20. There are a variety of treatments that could be applied to the card edge.

Figure 21:
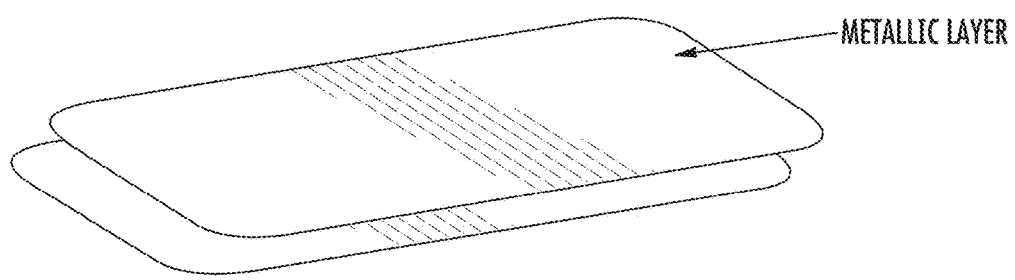
FIG. 21 illustrates a transaction card having a metal or non-metal foil layer(s).
Figure 22:
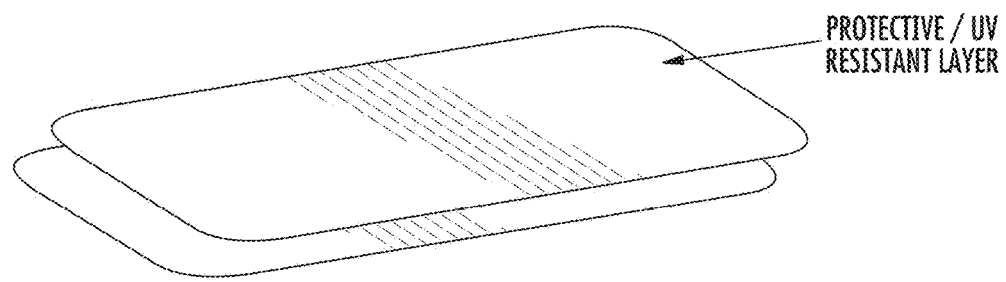
FIG. 22 illustrates a transaction card having an ultraviolet (UV) and/or scratch resistant layer(s).
Figure 23:
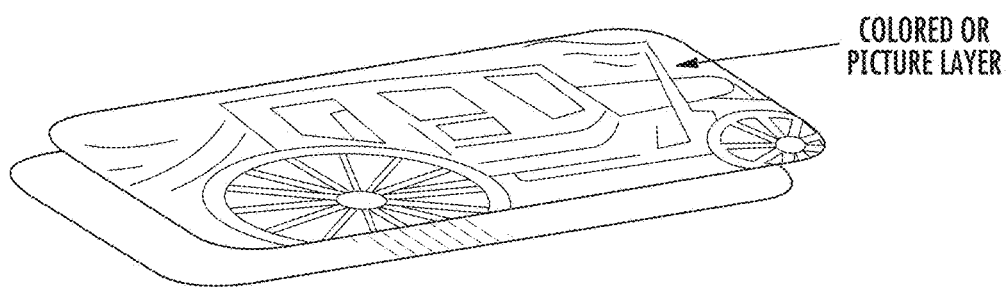
FIG. 23 illustrates a transaction card having a colored or picture layer(s) or areas.
Figure 24:
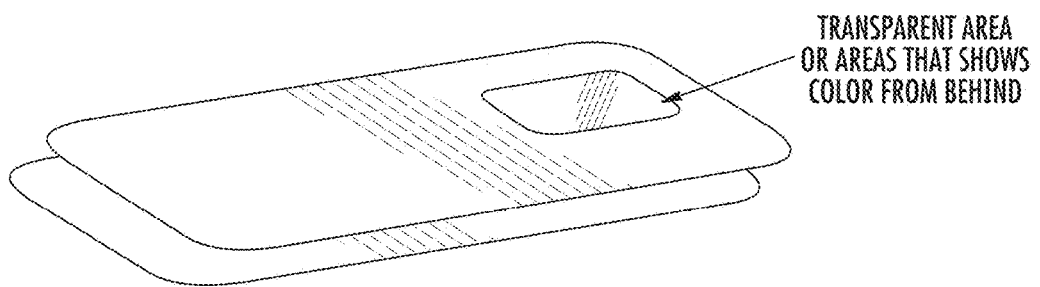
FIG. 24 illustrates a transaction card having a transparent layer(s) or areas.

A transaction card made by a method comprising continuous liquid interface production in accordance with the present invention may comprise layers of different types of materials. For example, FIG. 21 illustrates a transaction card having a metal or non-metal foil layer(s). FIG. 22 illustrates a transaction card having an ultraviolet (UV) and/or scratch resistant layer(s). FIG. 23 illustrates a transaction card having a colored or picture layer(s) or areas. Colored areas may include logos or other images, for example. FIG. 24 illustrates a transaction card having a transparent layer(s) or areas. As shown in FIG. 24, the transparent area of area(s) show color from behind.

Figure 25:
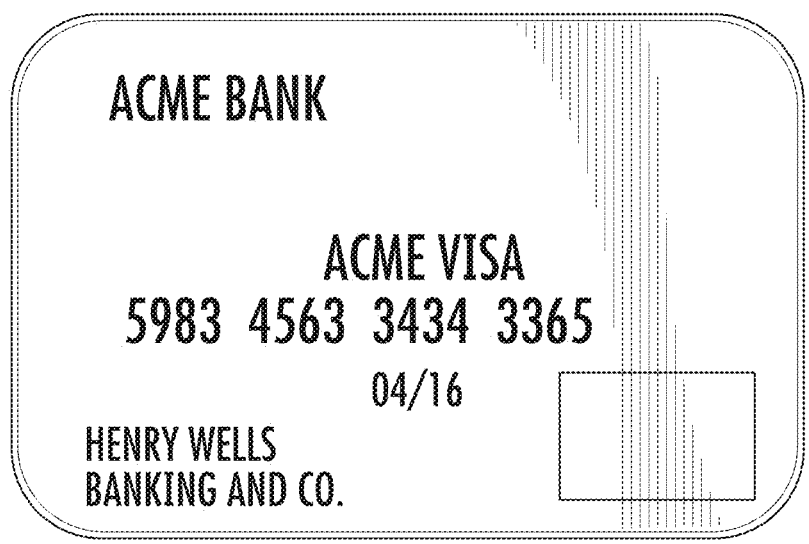
FIG. 25 illustrates a transaction card with personalization.
Figure 26:
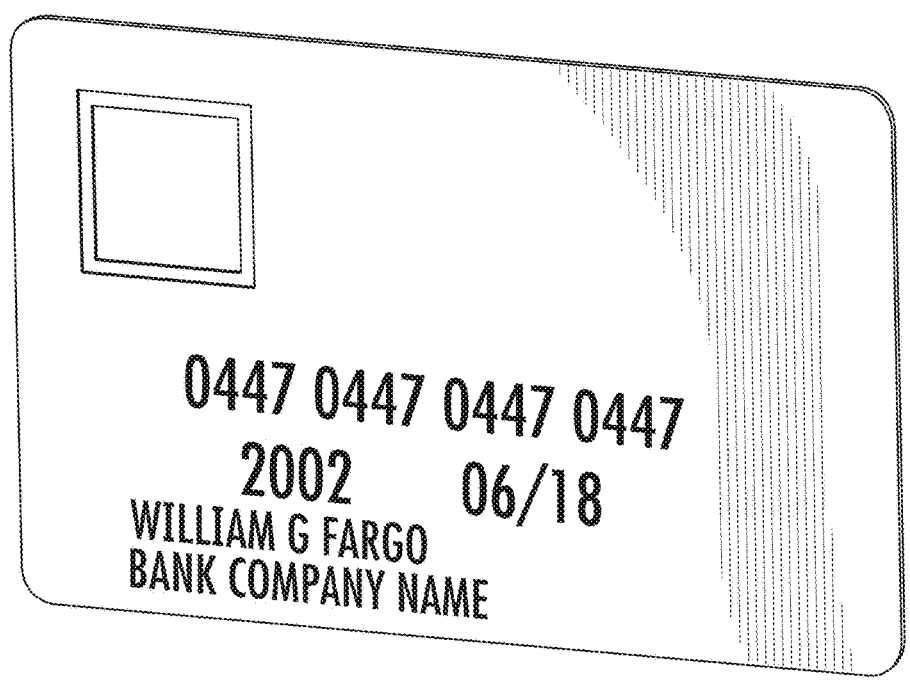
FIG. 26 illustrates that the lettering may be added by personalization with continuous liquid interface production in accordance with the method of the present invention.

Another aspect of a transaction instrument, including a transaction card, made by a method comprising continuous liquid interface production in accordance with the present invention is personalization. Part of personalization relates to fabrication. Fabrication is considered as part of making the body of the card through continuous liquid interface production. FIG. 25 illustrates a card with personalization. FIG. 26 illustrates that the lettering may be added by personalization in accordance with the method of the present invention. Created graphics may also be added.

As an additional step in a method comprising continuous liquid interface production, in either of the two examples below, the completed card would subsequently be personalized (lettering in black) typically at the time the card was needed for a particular customer. For a card made by a method comprising continuous liquid interface production, the card or set of cards on a sheet made through continuous liquid interface production would be reloaded into a continuous liquid interface production machine for personalization.

For a card made by other methods such as traditional layers, a card or set of cards on a sheet made through traditional lamination would be loaded to a continuous liquid interface production machine for personalization.

The present invention encompasses various ways in which to differentiate personalization from background including, but are not limited to, recessed, raised and a different shade or color. With recessed, the personalization would be at a lower elevation than the surface of the card. With raised, the personalization would be at a higher elevation than the surface of the card. With a different color or shade, the personalization would be a color and/or shade designed to differentiate it from the surface of the card. Color differentiation could be combined with either recessed or raised lettering/numbering. Examples of personalized elements include, but are not limited to, name, account number, expiration date, card verification number, braille, and orientation.

For the visually impaired, braille could be used as an optional indication of the card's identity, bank name, and acceptance brand (Visa, MasterCard, Discover, American Express). The braille could be of a different height.

With regard to orientation, text could be parallel to the long axis of the card, "horizontal" or text could be parallel to the shorter axis of the card, "vertical" or text could be a combination of horizontal and vertical. The transaction card or instrument itself could be made to be horizontal or vertical in orientation.

A transaction instrument made by a method comprising continuous liquid interface production can be manufactured at a remote location such as a retail store, bank branch, office, or a residence that has compatible continuous liquid interface production capability.

Remote manufacturing using a method comprising continuous liquid interface production could be accomplished under the control of the bank or other issuing institution at a remote location. This allows direct interaction with the customer for input into the customization and more expedient pickup or delivery.

Remote manufacturing using a method comprising continuous liquid interface production could also be accomplished under direct control of the end user by allowing the end user to download the required specification and files as well as acquire any non-continuous liquid interface production-made components required to produce the transaction instrument. A machine readable indicium and other non-continuous liquid interface production-made card components can be made available in a kit at the remote location for inclusion in a recess of the transaction card. The machine readable indicium can be made directly onto the transaction card inclusive of the recesses for continuous liquid interface production-made components.

Remote manufacturing using a method comprising continuous liquid interface production could also be accomplished by a distributor such as a retail store. In this instance, the store could produce one or a wide variety of transaction instrument types without the need to keep inventory of multiple transaction instrument types such as gift cards specific to a range of retailers. In another aspect of the present invention, a transaction card personalization line is provided. The transaction card personalization line comprises a continuous liquid interface production station for personalization of transaction cards. FIG. 27 illustrates a station of a personalization line identified as a continuous liquid interface production station for personalization. Examples of personalization include, but are not limited to, an indicium indicative of an account associated with the transaction card, a name of an individual or a company associated with the transaction card, Braille lettering, or a combination thereof. In another feature, the indicium is raised with respect to a surface of the transaction card. In still yet another feature, the indicium is of a different color than the surface of the card. Other stations may include, but are not limited to, magnetic strip and smart card encoding, laser engraving, color printing, graphics printing, basic topcoat and card guard UV-curing topcoat, embossing/topping, label affixing, and a combination thereof.

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements.

What is claimed is:

1. A method of making a transaction instrument, the method comprising:
   providing a pool of liquid photopolymer resin, and
   producing a transaction instrument by continuous liquid interface production using the pool of liquid photopolymer resin, comprising:
      curing a first portion of the liquid photopolymer resin using ultraviolet (UV) light, the first portion forming the transaction instrument being produced;
      blocking the UV light from a second portion of the liquid photopolymer resin using oxygen; and
      drawing the transaction instrument being produced upward from the pool of the liquid photopolymer resin.

2. The method according to claim 1, wherein the transaction instrument is comprised of one or more components from a computer model.

3. The method according to claim 1, wherein the continuous liquid interface production comprises photopolymerization, metal fusing, metal blend fusing, another selective fusing process, another photopolymerization process, or a combination thereof.

4. The method according to claim 1, further comprising finishing the transaction instrument by subtractive manufacturing.

5. The method according to claim 1, wherein the transaction instrument is comprised of polymer, plastic, metal, ceramic, carbon, graphite, or a combination thereof.

6. The method according to claim 5, wherein the transaction instrument is comprised of a plastic and metal blend.

7. The method according to claim 5, wherein the plastic is selected from the group consisting of polyvinyl chloride (PVC), polyvinyl chloride acetate (PVCA), polyester, polyethylene, polyethylene terephthalate, poly carbonate, polyethylene glycol (PET-G), acrylonitrile butadiene styrene (ABS), polypropylene, or a combination thereof.

8. The method according to claim 5, wherein some or all of the plastic is optically transparent.

9. The method according to claim 8, wherein the optically transparent plastic is opaque to some or all light outside of the visible spectrum.

10. The method according to claim 8, wherein the optically transparent plastic is opaque to ultraviolet light.

11. The method according to claim 1, wherein the transaction instrument is in a form of a card, fob, ring, watch, wrist band, bracelet, other electronic jewelry or other handheld device.

12. The method according to claim 11, wherein the card includes a machine readable indicium.

13. The method according to claim 12, wherein the transaction card comprises a recess to accommodate the machine readable indicium.

14. The method according to claim 13, wherein the recess is made by leaving a void during continuous liquid interface production or by using subtractive manufacturing after continuous liquid interface production.

15. The method according to claim 13, wherein continuous liquid interface production inclusive of the recess is done onto or around the machine readable indicium.

16. The method according to claim 12, wherein the machine readable indicium is made directly onto the transaction card inclusive of the recess during continuous liquid interface production.

17. The method according to claim 11, further comprising forming one or more recesses in the transaction instrument.

18. The method according to claim 17, wherein the one or more recesses comprise one or more inset devices including one or more of an integrated circuit, conducting contact pads, an EMV chip, or an antenna.

19. The method according to claim 18, wherein the inset device is set in a pocket or a pouch.

20. The method according to claim 17, wherein continuous liquid interface production inclusive of the recess is done onto or around the inset device.

21. The method according to claim 19, wherein continuous liquid interface production inclusive of the recess is done onto or around the pocket or the pouch.

22. The method according to claim 1, wherein the transaction instrument comprises a hole, decorative relief, image, personalization, decorative inset, decorative color variance, transparent portion or layer, inlay, recessed area, or a combination thereof.

23. A method of making a transaction instrument, the method comprising:
   making an object from a digital model by continuous liquid interface production, wherein the object is a financial transaction instrument, and wherein making the object comprises:
      curing a first portion of a pool of liquid photopolymer resin using ultraviolet (UV) light, the first portion forming the financial transaction instrument;
      blocking the UV light from a second portion of the liquid photopolymer resin using oxygen; and
      drawing the financial transaction instrument upward from the pool of liquid photopolymer resin.

24. The method according to claim 23, further comprising personalizing the transaction instrument through continuous liquid interface production.

25. The method according to claim 24, wherein the personalization comprises an indicium indicative of an account associated with the transaction instrument.

26. The method according to claim 25, wherein the indicium is raised with respect to a surface of the instrument.

27. The method according to claim 24, wherein the personalization comprises a name of an individual or a company associated with the transaction instrument.

28. The method according to claim 25, wherein the indicium is of a different color than a surface of the instrument.

29. The method according to claim 23, wherein the financial transaction instrument is a card.

30. A kit comprising:
   a transaction instrument made by continuous liquid interface production whereby the transaction instrument is formed from a pool of liquid photopolymer resin that is cured using ultraviolet (UV) light and the transaction instrument is drawn upward from the pool of liquid photopolymer resin, wherein other portions of the liquid photopolymer resin are blocked using oxygen during production of the transaction instrument, the transaction instrument having one or more recesses formed in the transaction instrument, and at least one of a machine readable indicium, integrated circuit, antenna, or a combination thereof, each configured for insertion into one of the one or more recesses.

* * * * *